United States Patent [19]

Gerber

[11] Patent Number: 4,843,574
[45] Date of Patent: Jun. 27, 1989

[54] APPARATUS AND METHOD FOR DETERMINING A COLOR FOR USE IN A FASHION DESIGN

[75] Inventor: Heinz J. Gerber, West Hartford, Conn.

[73] Assignee: Gerber Scientific, Inc., South Windsor, Conn.

[21] Appl. No.: 129,852

[22] Filed: Dec. 7, 1987

Related U.S. Application Data

[63] Continuation of Ser. No. 760,816, Jul. 31, 1985, abandoned.

[51] Int. Cl.⁴ .............................................. G01J 3/51
[52] U.S. Cl. ................................ 364/526; 356/418; 358/75; 358/80
[58] Field of Search ........................ 364/526; 350/349; 355/38; 356/404, 418; 358/75, 76, 78, 80

[56] References Cited

U.S. PATENT DOCUMENTS

| | | | |
|---|---|---|---|
| 4,097,892 | 6/1978 | Balding | 358/80 |
| 4,414,636 | 11/1983 | Ueda et al. | 364/526 |
| 4,488,245 | 12/1984 | Dalke et al. | 364/526 |
| 4,524,421 | 6/1985 | Searby et al. | 364/526 |
| 4,632,558 | 12/1986 | Maassen et al. | 356/404 |

FOREIGN PATENT DOCUMENTS

| | | | |
|---|---|---|---|
| 0169726 | 9/1985 | Japan | 364/526 |
| 0178322 | 9/1985 | Japan | 364/526 |

*Primary Examiner*—Parshotam S. Lall
*Assistant Examiner*—V. N. Trans
*Attorney, Agent, or Firm*—McCormick, Paulding & Huber

[57] ABSTRACT

A computer aided design system includes a means for varying the color of a part of a design created on a visual display screen. A selected color for part of the design is then measured to provide a set of color describing values useful in later reproducing the selected color in an actual garment or other article.

6 Claims, 1 Drawing Sheet

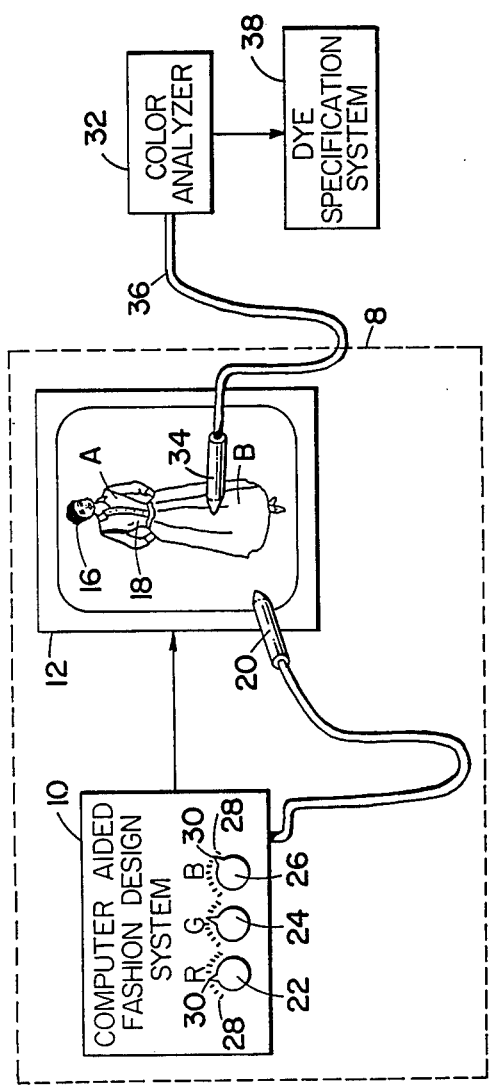
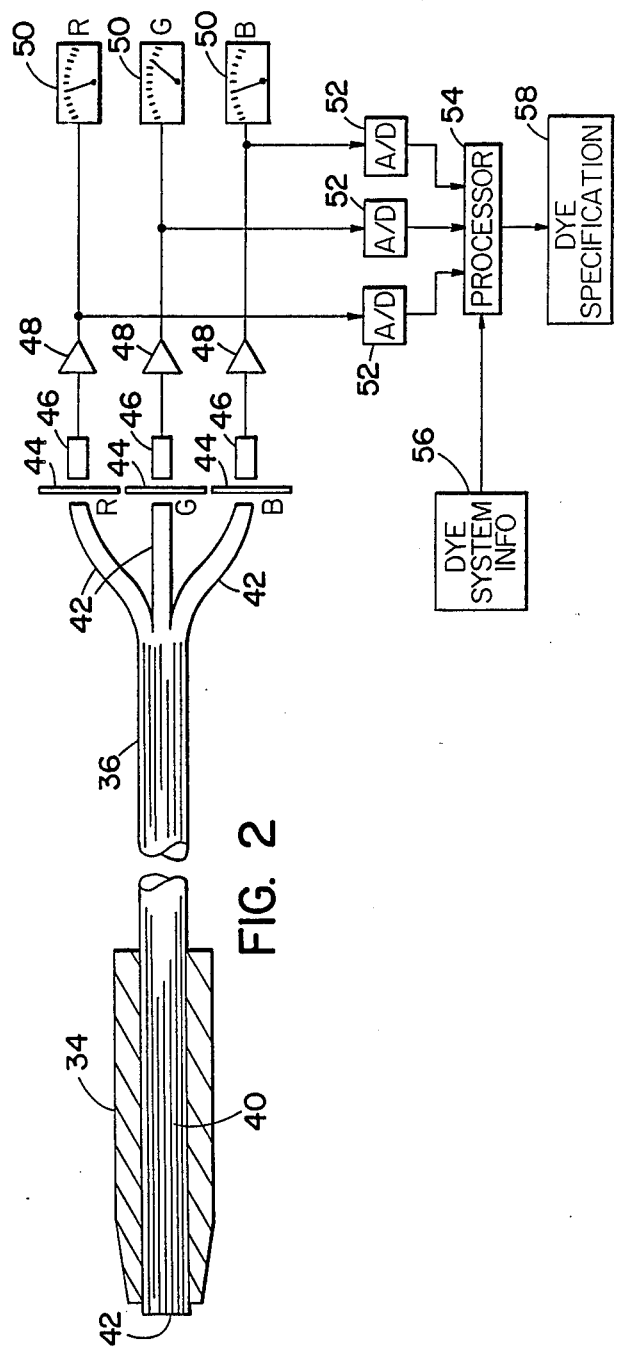

APPARATUS AND METHOD FOR DETERMINING A COLOR FOR USE IN A FASHION DESIGN

This is a continuation of co-pending application Ser. No. 760,816 filed on July 31, 1985, now abandoned.

BACKGROUND OF THE INVENTION

This invention relates to the field of computer aided design, and deals more particularly with an apparatus and method for determining the color or colors to be used with a given design.

The invention has particular utility in connection with the design of apparel fashions, and is described herein as applied to such use. However, its utility is not limited to apparel design and instead it may be used to advantage in the design of upholstery for furniture and automobiles, the design of advertising illustrations and in the creation of many other types of artistic designs. As used herein the term "fashion design" is intended to cover all such fields of possible use of the invention.

A relatively recent development in the apparel industry is that of computer aided systems for creating new apparel designs. Such a system conventionally includes a CRT or other display screen, a computer, and input devices such as a keyboard, a wiring table or a mouse, interactive with the computer and an operator and allowing the operator with the aid of the computer to create a two or three-dimensional design on the screen and to make desired instantaneous changes in the design. For example, the screen may be made to show a three-dimensional representation of a human body and the operator may then clothe such representation in different apparel fashions. The three-dimensional design can be rotated to different positions to show the selected apparel design from different angles. The operator makes changes in the design shown on the screen until an acceptable final design is arrived at, after which the system captures the design for future use. As part of this capturing process the computer may be used to generate representations of the two-dimensional pattern pieces required for making apparel reproducing the final design.

The color or colors of a fashion design are usually of considerable importance, and the object of the present invention is to provide an apparatus and method usable with or as part of a computer aided design system for selecting and describing the colors to be used with a fashion design.

A further object of the invention is to provide a color determining apparatus and method of the foregoing character which may also directly provide a specification for dyes to be used in dying a textile to reproduce a color selected for a fashion design.

Other objects and advantages of the invention will be apparent from the following description and from the drawings forming a part thereof.

SUMMARY OF THE INVENTION

The invention resides in an apparatus for determining a color for use in a fashion design which apparatus includes a visual display screen along with a means for creating a colored image of a fashion design on such screen and a means for varying the color of at least a part of the image until a color acceptable to the operator is attained. Cooperating with these means, the apparatus further includes a means for measuring the color of a given part of the image to provide a set of values describing the measured color which may be used to select or produce the cloth or other material used in creating an actual garment or other article from the image on the display screen.

The invention also resides in the particular means used for measuring the color of a part of the image, and in the apparatus further including a means for using the set of color describing values produced by the color measuring means to provide a specification of dyes to be used in reproducing the measured color on a fabric.

The invention still further resides in corresponding related methods for determining a color for use in a fashion design.

BRIEF DESCRIPTION OF THE DRAWINGS

FIG. 1 is a schematic view illustrating an apparatus embodying the present invention.

FIG. 2 is a generally schematic view showing the color sensing probe of the apparatus of FIG. 1 together with associated parts of the color analyzer and dye specification system.

DETAILED DESCRIPTION OF THE PREFERRED EMBODIMENT

FIG. 1 shows a computer aided fashion design system 8 a major portion of which is schematically illustrated by the box 10 and which also includes a display terminal 12 having a visual display screen 14, such as the screen of a cathode ray tube. The portion of the system represented by the box 10 includes a programmed computer, data bases, and input devices sufficient to allow an operator to create and vary an image on the screen 14 useful in the creation of a fashion design. Such image may vary widely but in the illustrated and preferred case it is taken to include some representation 16 in whole or in part of a human body along with the representation 18 of a garment or other piece of apparel worn by the body. The apparel image 18 is the portion of the total image whose design is of interest and may be referred to as the fashion design image. This fashion design image 18, as mentioned, can be changed by the operator, and generally it along with the body image can be rotated on the screen to show it viewed from different angles, until a desired or final design is attained. This final design can then be captured in various ways for further use in reproducing an actual garment from it. In some instances the computer of the system may be programmed to generate from the selected final design information concerning the two-dimensional shape of pattern pieces to be used in creating a garment from the image. In the process of generating the pattern piece information the computer may also perform pattern grading to allow selection of the size of garment for which the pattern pieces are to be made.

In keeping with the present invention, the computer aided fashion design system of FIG. 1 includes a means for creating a colored image on the screen 14 and a means for varying the color of at least a part of that image. That is, the screen 14 is a color screen so that the image 18 of the fashion design can be shown in one or more colors. By way of example the design image 18 of FIG. 1 is shown to have two different parts A and B each of which may be of the same or different color. The system 8 includes a stylus 20, moveable by the operator which may be touched to the screen 14 to identify a selected point or part of the image on the screen. Thus the stylus 20 may be touched to the part A or the part B of the image to indicate that part. After the part A or the part B is so selected its color may be varied by varying the illustrated three manually operable knobs 22, 24 and 26. These three knobs control respectively the three additive primary colors red, green and blue used in creating the colored image on the screen 14. Assuming the part A is the selected part of the image, the knob 22 controls the amount of the red component appearing in the color of part A, the knob 24 controls the amount of the green component of that color and the knob 26 controls the amount of the blue component. Therefore by varying the knobs 22, 24 and 26 the part A can be shown in an infinite variety of colors under the control of the operator. Preferably the system is such that after an acceptable color has been selected for one part, such as part A, of the image that color can thereafter be held while the color of another part is varied until a final color selection for all parts of the design image 18 is made.

After the operator arrives at a final color choice for each or all parts of the fashion image design 18 the invention provides for the measurement of such color or colors to yield a set of color describing values which may later be used in reproducing the colors in question in an actual garment or article.

The color measuring means may take various different forms. In one case the measuring means may consist of the knobs 22, 24 and 26 each having associated with it a scale 28 and a pointer 30 for assigning a value to the position of each knob. Since the characteristics of color cathode ray tubes vary significantly from tube to tube each scale 28 is preferably precalibrated using a color analyzer in conjunction with the image on the screen 14 to cause the values given by the scale and associated pointer to agree with a recognized standard of color values. Thus after the knobs 22, 24, 26 have been adjusted to yield a desired color in an associated part of the fashion image 18, the associated scales 28 and pointers 30 may be read to provide a set of three color value numbers defining the red, green and blue components of the selected color sufficiently for subsequent reproduction.

FIG. 1 also shows another means for measuring the color of a part of the image 18. In this case the color is measured directly from the screen 14 using a color analyzer 32 having a probe 34 moveable by the operator. The probe 34 when placed against the screen 14 picks up light from the screen which is transmitted through a light conductor 36 to the color analyzer which analyzes the light and provides a set of values defining its color. If desired, this set of color defining values may then be transmitted to a dye specification system which, with respect to a given system of dyes, converts the numbers to information specifying the types and amounts of dyes to be used to recreate the sensed color on a given textile or other material.

The color analyzer 32 and its probe 34 may take various different forms without departing from the broader aspects of the invention and for example may take the form shown in more detail in FIG. 2. Referring to FIG. 2 the probe 34 surrounds the input section 40 of the light conductor 36, the latter being a flexible bundle of optic fibers having an input face 42. At its opposite or right hand end as seen in FIG. 2 the conductor has an output section wherein the fibers of the bundle are divided into three sub-bundles 41. Adjacent the output face of each sub-bundle is a filter 44 and on the opposite side of the filter is a photocell 46. The filters 44 are respectively red, green and blue filters as indicated by the letters R, G and B in FIG. 2. The output of each photocell 46 is amplified by an amplifier 48 and the output of each amplifier is connected to a meter 50.

From FIG. 2 it will be understood that when the input face 42 of the probe 34 is placed against the screen 14 light emitted from the screen will enter the conductor 36 and equal, or at least known, fractions of the picked up light will be separately transmitted to the red, green and blue filters 44. The red filter 44 passes only the red component of the light emitted onto its, the green filter 44 transmits only the green component of the light emitted onto it and likewise the blue filter transmits only the blue component of the light emitted onto it. Therefore, the readings of the three meters 50, 50 provide a set of three numbers which can be used to describe the sensed color and preferably the meters are calibrated so that such numbers correspond to a recognized color standard.

Instead of or in addition to the outputs of the amplifiers 48 being transmitted to the meters 50 they may be converted to digital values and the digital values used by a data processor for additional purposes. Such analog to digital converters are shown at 52 in FIG. 1 and supply a digital set of three color defining numbers to a processor 54, which may be the processor of the computer aided fashion design system 8.

Associated with the processor 54 of FIG. 2 is a data base 56, stored in computer memory, providing information describing a given system of dyes. The processor 54 is programmed to process the digital values describing a color, provided by the analog to digital converters 51 in conjunction with the dye system information provided by the data base 56, to provide a set of dye specifications 58 describing the type and amount of dye to be used in recreating the color described by the digital values on a given type of material.

As examples of equipment which may be used to convert the digital outputs of the analog to digital converters 52 into a set of dye specifications 58, reference is made to the following articles:

*A & E is First to Match Color by Digital Computer,* Textile World, Issue of June 1967.

*Computer Color Matching Provides Wide Spectrum of Benefits at Uniroyal,* America's Textile Reporter, Issue of July 2, 1970.

A. G. Farley, *Colors Matched in Minutes,* Textile Industries, Issue of July 1968.

E. R. McLean, *A Millman's Use of the Computer,* Textile Chemist and Colorist, Issue of Apr. 9, 1979.

T. S. Greenwood, *Computer Color Matching,* Fibre and Fabric, Issue of August 1968.

*Computerized Dyeing,* Dixie Yarns, Issue of Winter 1967.

The first mentioned article, for instance, describes a computerized color matching system wherein a given shade or color to be matched is first analyzed using a spectrophotometer to derive measured color values for sixteen different wave lengths or colors. These color values are then recorded on punched cards used to supply the color values to a computer in digital form. The computer then operates using the input color values and stored dye information to produce a set of output specifications defining dyes to be used to match the given shade on a given fabric. The sixteen digital color values inputted to the computer are equivalent to the three digital values supplied to the processor 54 by the three analog to digital converters 52. A difference between the computerized color matching system described in the first mentioned article and that described herein by applicant is that the article proposes using sixteen input color values whereas applicant proposes using only three input color values. However, this is a matter of degree only.

The other articles mentioned above likewise disclose computerized color matching systems wherein the shade or color to be matched is supplied to a computer by means of a number of digital values evaluating the shade at a number of different wave lengths.

As used above in describing the visual display screen 14, and in the claims which follow, the term "light emitting screen" refers to a screen, such as that of a cathode ray tube, wherein the light emitted from the screen is generated by the device of which the screen is a part and is not merely light reflected from the screen and emanating from a source located remote from and generally to the front of the screen.

I claim:

1. An apparatus for determining a color for use in a fashion design, said apparatus comprising:
    a light emitting visual color display screen,
    means for creating a colored image of a fashion design on said screen,
    means for varying the color of at least part of said image until an acceptable color for said part is attained, and
    means for capturing light emitted from the portion of said display screen corresponding to said part of said image and for measuring the color of said captured light to provide a set of values describing said color of said part of said image and which values can be subsequently used to specify the color for the corresponding part of an actual article patterned on said fashion design image.

2. An apparatus for determining a color for use in a fashion design, said apparatus comprising:
    a visual display screen,
    means for creating a colored image of a fashion design on said screen,
    means for varying the color of at least a part of said image, and
    means for measuring the color of said part of said image to provide a set of values describing said color,
    said visual display screen being the screen of a cathode ray tube, and said means for measuring the color of said part of said image being a measuring instrument wherein light emitted from said part of said image is passed separately though a plurality of color filters and wherein the amount of light passing though each of said filters is sensed to provide a related one of said values of said set,
    said measuring instrument including a manually positionable probe which may be moved to any part of said screen to pick up a color for measurement by the remainder of said instrument, and a light conductor comprised of a bundle of optic fibers connected with said probe, said light conductor having an output section divided into a plurality of sub-bundles of optic fibers each of which sub-bundles emits light conducted by it onto a respective one of said filters.

3. An apparatus for determining a color for use in a fashion design, said apparatus comprising:
    a visual display screen,
    means for creating a colored image of a fashion design on said screen,
    means for varying the color of at least a part of said image,
    means for measuring the color of said part of said image to provide a set of values describing said color, and
    means responsive to said set of values describing said color for providing a specification of dyes to be used for reproducing said measured color of said part of said image on a fabric dyed in accordance with said specification of dyes.

4. An apparatus for determining a color for use in a fashion design as described in claim 3 further characterized by said means for providing a specification of dyes comprising a data processor for processing said set of values describing said color in conjunction with a computer memory resident set of dye system information to produce said specification of dyes.

5. A method for determining a color for use in a fashion design, said method comprising the steps of:
    providing a computer aided fashion design system including a light emitting visual display screen,
    creating a colored image of a fashion design on said screen,
    varying the color of at least a part of said image until an acceptable color for said part is attained, and
    measuring said acceptable color of said part of said image to provide a set of values describing it,
    said step of measuring said acceptable color of said part of said image being carried out by using an instrument for measuring said acceptable color directly from said screen.

6. A method for determining a color for use in a fashion design said method comprising the steps of:
    providing a computer aided fashion design system including a visual light emitting screen,
    creating a colored image of a fashion design on said screen,
    varying the color of at least a part of said image until an acceptable color for said part is attained,
    measuring said acceptable color of said part of said image to provide a set of values describing it, and
    subsequently using said set of values to determine the color of the corresponding part of an actual article patterned on said fashion design image,
    said computer aided fashion design system including a plurality of manually adjustable control elements each of which elements adjusts an associated component of the color of said part of said image and which manually adjustable control elements are used to vary said color in said step of varying the color of at least a part of said image and said step of measuring said acceptable color being carried out by assigning a value to each of said color components in accordance with the position of the associated one of said manually adjustable control elements.

* * * * *